United States Patent
Metke et al.

(10) Patent No.: US 7,792,050 B2
(45) Date of Patent: Sep. 7, 2010

(54) METHOD FOR INTELLIGENT MERGING OF AD HOC NETWORK PARTITIONS

(75) Inventors: Anthony R. Metke, Naperville, IL (US); Randy L. Ekl, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 376 days.

(21) Appl. No.: 11/924,859

(22) Filed: Oct. 26, 2007

(65) Prior Publication Data
US 2009/0109870 A1    Apr. 30, 2009

(51) Int. Cl.
*H04L 12/28* (2006.01)
(52) U.S. Cl. .................. 370/252; 370/254; 370/338; 370/349; 370/389
(58) Field of Classification Search .................. None
See application file for complete search history.

(56) References Cited

U.S. PATENT DOCUMENTS

| | | | | |
|---|---|---|---|---|
| 6,633,757 | B1 * | 10/2003 | Hermann et al. | 455/414.1 |
| 6,662,219 | B1 * | 12/2003 | Nishanov et al. | 709/220 |
| 2001/0023446 | A1 * | 9/2001 | Balogh | 709/229 |
| 2002/0061009 | A1 * | 5/2002 | Sorensen | 370/351 |
| 2004/0230474 | A1 | 11/2004 | Dogan et al. | 705/10 |
| 2004/0240474 | A1 | 12/2004 | Fan | 370/475 |
| 2007/0299950 | A1 * | 12/2007 | Kulkarni | 709/223 |

FOREIGN PATENT DOCUMENTS

EP    WO2007094183 A1    8/2007

OTHER PUBLICATIONS

PCT Search Report Application No. PCT/US2008/079248 Dated Jan. 22, 2009—15 Pages.
Deepesh Man Shrestha et al: Enhanced Topology Formation Protocol for IEEE 802.11WLAN Based Mesh Networks Dated Jan. 1, 2007—5 Pages.
Zhou, H.; NI, L.M.; Mutka, M.W., "Prophet address allocation for large scale MANETs," INFOCOM 2003 IEEE, pp. 1304-1311, Mar. 2003.

* cited by examiner

*Primary Examiner*—Chi H. Pham
*Assistant Examiner*—Shick Hom
(74) *Attorney, Agent, or Firm*—Randi L. Karpinia

(57) ABSTRACT

A method for merging of ad hoc network partitions within an ad hoc network, the method includes forming a plurality of network partitions by forming a security association among each of a group of partitioned nodes. Each network partition includes a Network Identifier. A node operating within one of the network partitions receives an update message from another node, compares its current Network Identifier to the received Network Identifier; and determines whether to update to the received Network Identifier using an arbitration method when the received Network Identifier is different from the current Network Identifier.

22 Claims, 8 Drawing Sheets

METHOD FOR INTELLIGENT MERGING OF AD HOC NETWORK PARTITIONS

FIELD OF THE INVENTION

The present invention relates generally to ad hoc networks, and more particularly to intelligent merging of ad hoc network partitions.

BACKGROUND

Ad hoc networks are self-forming networks which can operate in the absence of any fixed infrastructure. In some cases, the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network.

One characteristic of the nodes is that each node can directly communicate over a short range with nodes which are a single "hop" away. Such nodes are sometimes referred to as "neighbor nodes." When a node transmits packets intended for a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through communication with neighboring nodes. The routing information can also be periodically broadcast in the network to reflect the current network topology. Alternatively, to reduce the amount of information transmitted for maintaining accurate routing information, the network nodes may exchange routing information only when it is needed. In an approach known as Mesh Scalable Routing (MSR), nodes periodically send HELLO messages (e.g., once per second) that contain routing and metrics information associated with the route to its bound intelligent access point (IAP), and discover certain peer routes on-demand.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using intelligent access points (IAP) which provide wireless nodes with access to a wired backhaul.

Wireless ad hoc networks can include both routable (meshed) nodes and non-routable (non-meshed) nodes. Meshed or "routable" nodes are devices which may follow a standard wireless protocol such as the various protocols associated with the Institute of Electrical and Electronics Engineers (IEEE) 802 standards. These devices are responsible for forwarding packets to/from the proxy devices which are associated with them. Non-meshed or "non-routable" nodes are devices following a standard wireless protocol such as the various IEEE 802 standards but not participating in any kind of routing. These devices are "proxied" by meshed devices which establish routes for them. Any of the IEEE standards or specifications referred to herein may be obtained by contacting the IEEE at IEEE, 445 Hoes Lane, PO Box 1331, Piscataway, N.J. 08855-1331, USA.

As wireless communications networks become more prevalent, security continues to be a major concern to both communication network providers and end users. This is most evident when using a mobile wireless network where the security environment can offer the greatest challenges since data may be readily received and manipulated by many nodes. The radio links used in a wireless network expose the signaling and data traversing the network to eavesdroppers and/or would-be hackers. In a multi-hop wireless network, this requires each link in the meshed devices to have a unique security association established through the multi-hop authentication and key management process. Then, the frames over the air on the wireless link can be protected with the established security associations.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
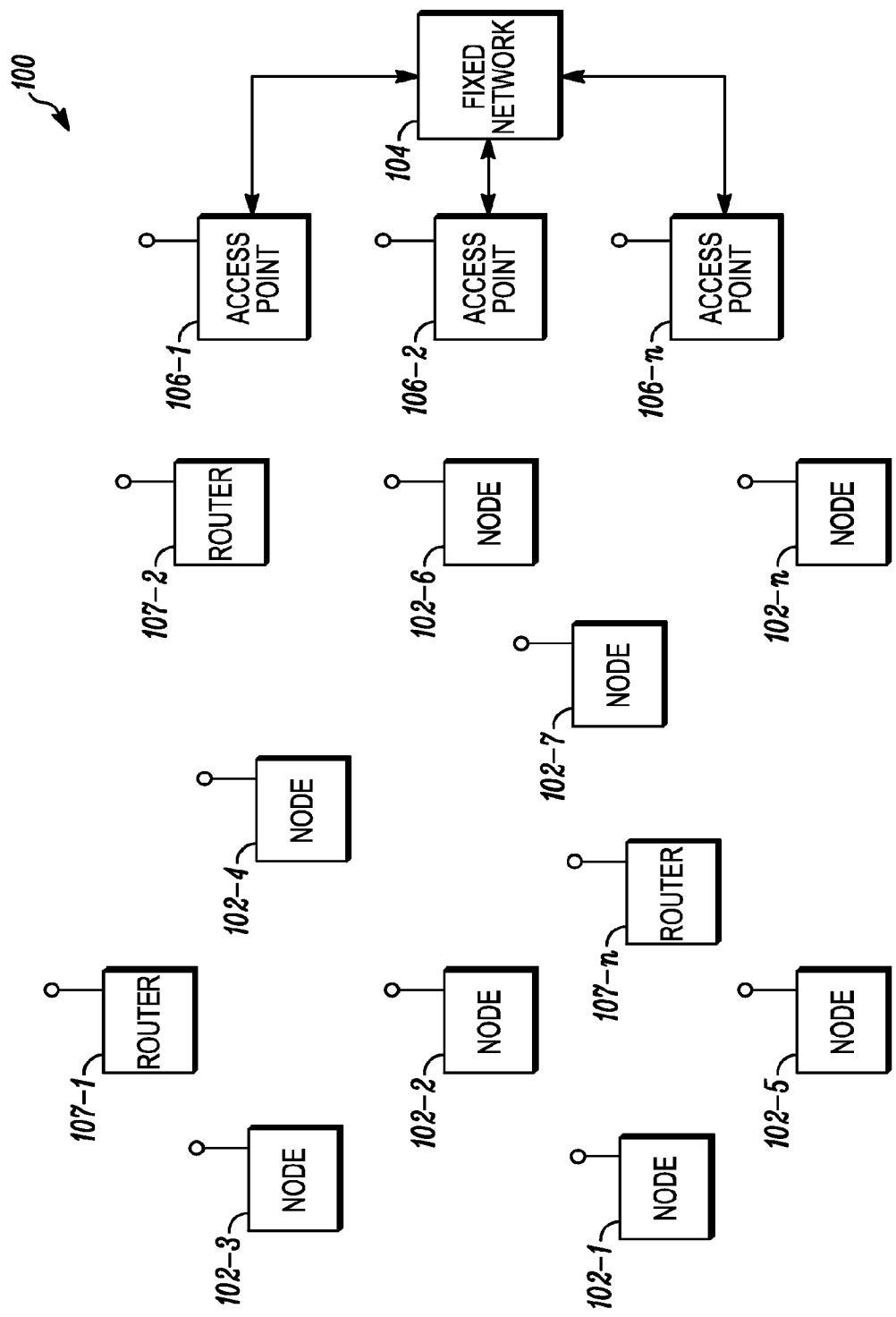
FIG. 1 is a block diagram illustrating an example ad hoc communications network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to intelligent merging of ad hoc network partitions. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of intelligent merging of ad hoc network partitions described herein. The non-processor circuits may include, but are not limited to, a radio receiver, a radio transmitter, signal drivers, clock circuits, power source circuits, and user input devices. As such, these functions may be interpreted as steps of a method to perform intelligent merging of ad hoc network partitions. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a block diagram illustrating an example ad hoc communications network 100. The ad hoc wireless network 100, for example, can be a mesh enabled architecture (MEA) network or an 802.11 network (for example: 802.11a, 802.11b, 802.11g, or 802.11s) or other equivalent network. It will be appreciated by those of ordinary skill in the art that the communication network 100 in accordance with the present invention can alternatively comprise any packetized communication network where packets are forwarded across multiple wireless hops. For example, the ad hoc wireless network 100 can be a network utilizing packet data protocols such as OFDM (orthogonal frequency division multiplexing), OFDMA (orthogonal frequency division multiple access), TDMA (time division multiple access), GPRS (General Packet Radio Service) and EGPRS (Enhanced GPRS). Additionally, each wireless hop of the packetized communication network 100 may either employ the same packet data protocol as the other hops, or a unique packet data protocol per hop. As used herein, the term "ad hoc network" refers to a self-configuring network of nodes connected by wireless links, the union of which form an arbitrary topology.

As illustrated in FIG. 1, the communication network 100 includes a plurality of mobile nodes 102-1 through 102-n (referred to also as mesh nodes 102, mesh points 102, nodes 102, mobile nodes 102, or mobile communication devices 102).

The communication network 100 can, but is not required to, include a fixed network 104 having a plurality of intelligent access points (IAP) 106-1, 106-2, . . . 106-n (referred to generally as nodes 106 or access points 106), for providing nodes 102 with access to the fixed network 104. The fixed network 104 can include, for example, a core local area network (LAN), and a plurality of servers and gateway routers to provide network nodes with access to other networks, such as other ad-hoc networks, a public switched telephone network (PSTN) and the Internet.

As used herein, the term "Access Point (AP)" refers to a device communicatively connected either directly (via a wired link) or indirectly (via a wireless link) to a wired network that enables remote wireless nodes to communicate with the wired network (e.g. local area network (LAN), wide area network (WAN), etc.). An AP connects wireless communication devices which are in its direct communication range (i.e. one-hop away) together to form a wireless network. In many cases, the AP connects to a wired network, and can relay data between wireless devices and wired devices. IAPs can enable communication between the wired network and remote wireless nodes which are multiple hops away.

The communication network 100 further can include a plurality of fixed or mobile routers 107-1 through 107-n (referred to generally as nodes 107 or communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly or indirectly. When communicating indirectly, one or more other nodes 102, 106 or 107, can operate as a router or routers for forwarding or relaying packets being sent between nodes. As used herein, the term "meshed node" refers to a communication device which has "meshing capability" meaning that a node has routing functionality and can route traffic to and from other nodes with routing functionality. Examples of meshed nodes include a mesh point (MP), a Mesh Access Point (MAP), and an intelligent Access Point (IAP).

It will be appreciated by those of ordinary skill in the art that routing of data within the ad hoc communication network 100 can be reactive, proactive, or a hybrid. Reactive routing comprises setting up routes for communicating data between a source and a destination when the route is needed. Examples of reactive routing are AODV (Adhoc On-demand Distance Vector) and DSR (Dynamic Source Routing) protocols. Proactive routing comprises maintaining routes to every other node in the network at all times. Examples of proactive routing include DSDV (Destination Sequence Distance Vector), OLSR (Optimized Link State Routing), and TBRPF (Topology Dissemination Based on Reverse Path Forwarding). Hybrid routing is a combination of reactive and proactive routing such as ZRP (Zone Routing Protocol).

Security concerns in ad hoc communication networks include unauthorized usage of network resources, monitoring and modification of network traffic, and network availability attacks. To avoid some of these issues, establishment of link security via a security association is typically required before a node may send a routing message to its neighbor. Security solutions can be centralized or distributed.

In a centralized security solution, a security association is established between an authentication server or an access point and a node joining the network. The access point will authenticate each node's network access request. Then a security association will be established after mutual authentication between the node and the access point. Each packet routed thereafter to/through the node will be protected based on the security association.

In a distributed security scheme, such as a peer-to-per security scheme, each node identifies neighbor nodes within communication range and establishes a secure link individually with each of the identified neighbor nodes. Neighboring nodes can authenticate each other through an internal authentication mechanism. The ad hoc network is then formed based on a chained trust model. Packet encryption is done from one node to another using authentication credentials such as group identifications, group passwords or digital certificates.

Hop by hop security mechanisms can interfere with the various routing mechanisms described above because with hop by hop security, it is not always practical to have a security association with each and every one of a node's neighbors. For example, in AODV, a source broadcasts a route request (RREQ) packet to its neighbors, which in turn, forward it to their neighbors, and so on, until either the destination node or an intermediate node with a valid route to the destination is located. When hop by hop security mechanisms are implemented, the broadcast RREQ packets will not necessarily be decrypted by all neighbors. In such an environment, it is possible for the network to form logical partitions that have overlapping coverage, but who are unable to communicate between partitions.

Figure 2:
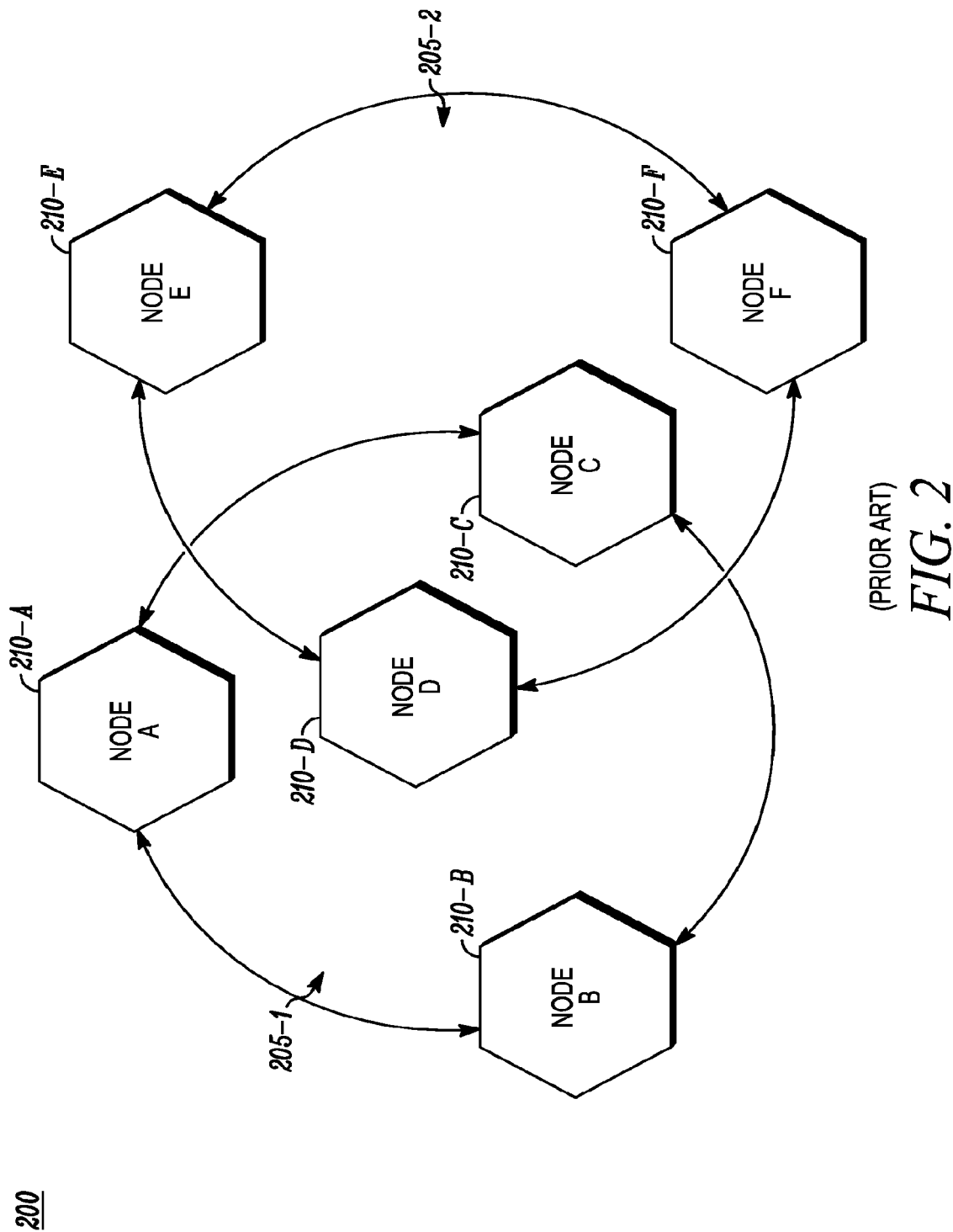
FIG. 2 illustrates an example communication network separated into two network partitions.

FIG. 2 illustrates an example communication network 200 separated into two network partitions (a first network partition 205-1 and a second network partition 205-2). It will be appreciated by those of ordinary skill in the art that the communication network 200 can be, for example, a portion of the network 100 of FIG. 1. As illustrated in FIG. 2, node A 210-A, node B 210-B, and node C 210-C have formed security associations with each other, thereby forming the first network partition 205-1. Similarly, node D 210-D, node E 210-E, and node F 210-F have formed security associations with each other, thereby forming the second network partition 205-2.

In the communications network 200, communications is not possible between the network partitions 205-1 and 205-2 because the nodes involved are not aware that multiple partitions exist. Therefore, it would be desirable in such situations to implement a method to recognize whether a neighboring node is part of the current ad hoc network (partition) or part of another ad hoc network. With such functionality available, when two unconnected ad hoc networks merge, the edge nodes will be able to tell that their new neighbors are not already members of the same ad hoc network.

In accordance with the present invention, it is assumed that all nodes in a contiguously connected ad hoc network use the same Network Identifier (for example, a Basic Service Set Identifier (BSSID)). Ensuring that all nodes in the partition use the same value for the Network Identifier for normal cases where nodes individually join the partition and adopt the current Network Identifier is easily implemented. However, it is somewhat more complex when multiple partitions merge, or when one contiguous network partitions into multiple non-contiguous segments.

For example, when a node connected to an ad hoc network discovers neighbors with the same Service Set Identifier (SSID) and a different BSSID (for example it receives an "in the clear" Beacon from the neighbor), then the node knows that multiple partitions exist and, if configured to do so, it must form a bridge between the two partitions.

A node, in accordance with the present invention, bridges two partitions of a network by authenticating to a node in a new partition. If the Network Identifier of the new partition is different than the current partition, then the node determines which Network Identifier to utilize. For example, in one scenario, when the Network Identifier is a BSSID, the node may adopt the BSSID with the smaller value. When the node determines to change its network identifier, it thereafter transmits a Network Identifier update message to its neighbors. When a node receives a Network Identifier Update message, it will update its current Network Identifier and propagate the Network Identifier Update message to its neighbors.

Figure 3:
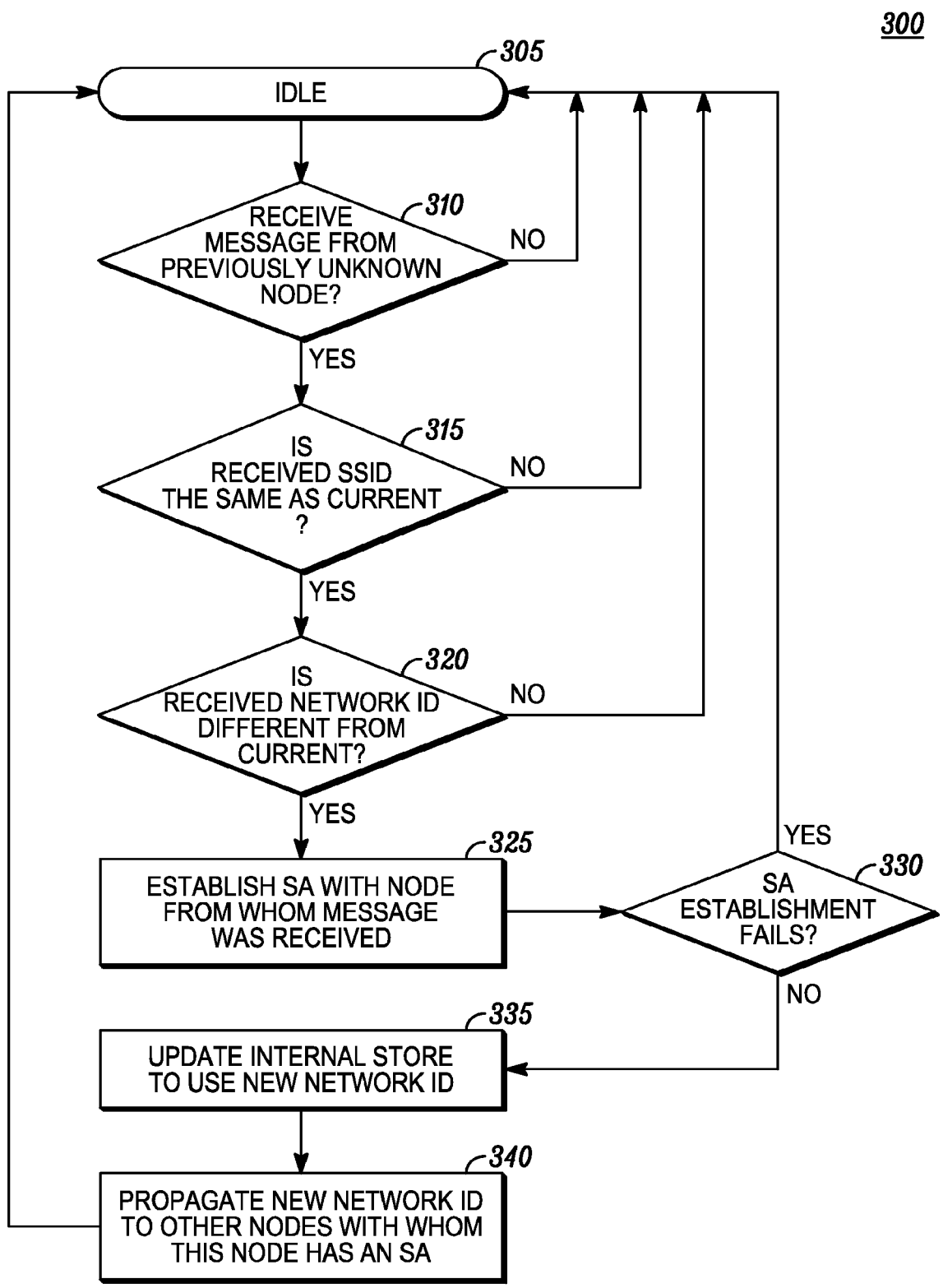
FIGS. 3 and 4 are flowcharts illustrating various merge algorithms in accordance with some embodiments of the present invention.
Figure 4:
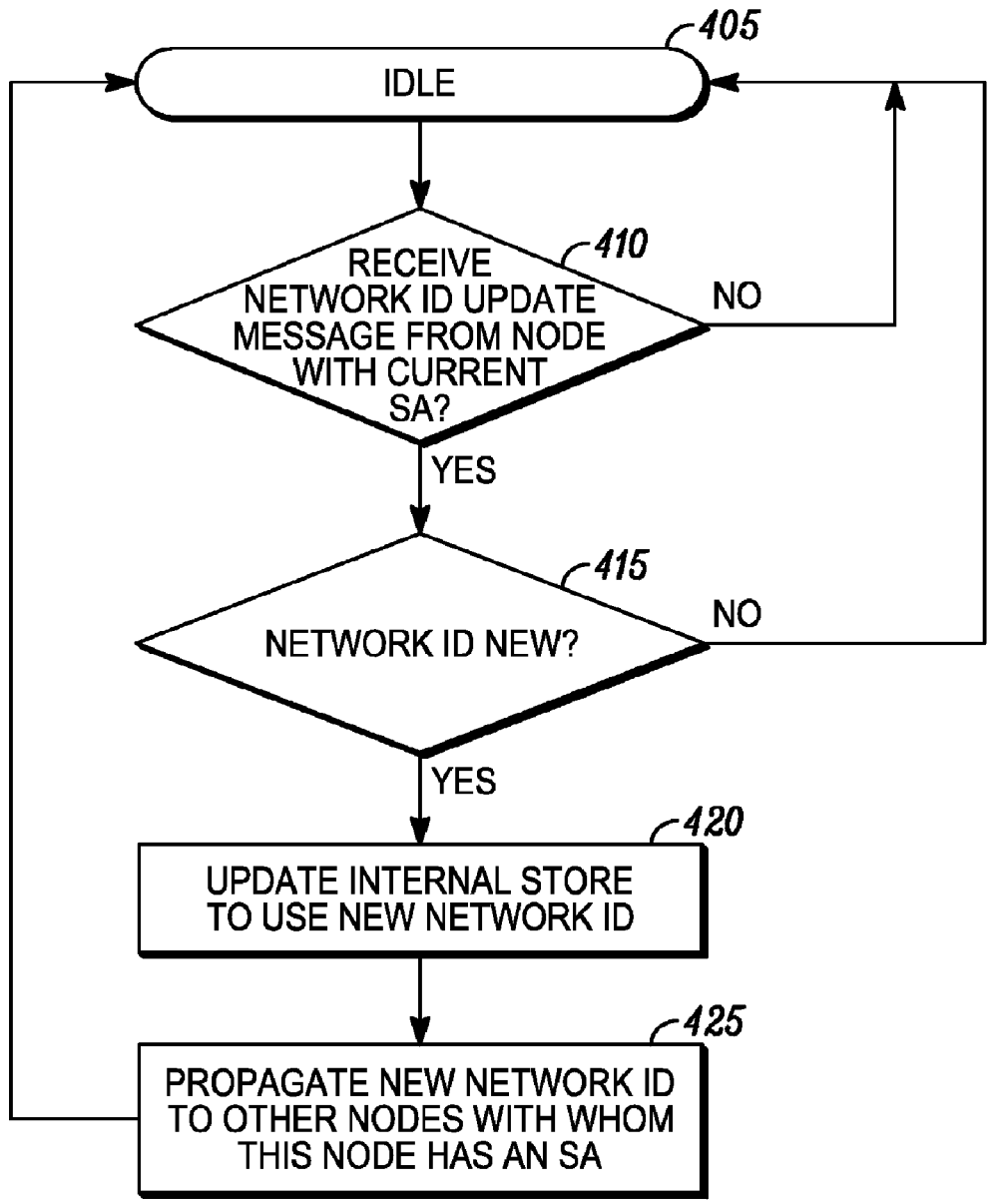

FIGS. 3 and 4 are flowcharts illustrating various merge algorithms in accordance with some embodiments of the present invention.

FIG. 3 is a flowchart illustrating a merge algorithm in accordance with some embodiments of the present invention. Specifically, FIG. 3 illustrates the operation 300 of a node within a communication network in accordance with the present invention. As illustrated, the operation 300 begins with Step 305 in which the node is in an idle state. Next, in Step 310, the node determines whether it has received a message from a previously unknown node. The message, for example can be a beacon. If it has not received a message from a previously unknown node, the operation cycles back to the idle state of Step 305. If it has received a message from a previously unknown node, the operation continues to Step 315 in which the node determines whether the SSID for the received message is the same as the node's current SSID. When the SSID is not the same, the operation cycles back to the idle state of Step 305. When the SSID is the same, the operation continues to Step 320 in which the node determines whether the Network Identifier received in the message is different from its current Network Identifier. For example, as illustrated, when the Network Identifier is a BSSID, the node can determine whether the BSSID received is lower than the node's current Root node's BSSID. The nodes' root is the node at which operations commonly begin (although some algorithms begin with the leaf nodes and work up ending at the root). All other nodes can be reached from it by following edges or links. When the received Network Identifier is not different from the node's current Network Identifier (for example, the BSSID received is not different than the node's current Root node's BSSID) the operation cycles back to the idle state of Step 305. When the received Network Identifier is different from the node's current Network Identifier, the operation continues to Step 325 in which the node establishes a security association (SA) with the node from which the message and Network Identifier was received. Next, in Step 330, the node determines whether the security association has failed. When the security association has failed, the operation cycles back to the idle state of Step 305. When the security association does not fail, the operation continues to Step 335 in which the node updates its internal memory to use the new Network Identifier if it determines that it is a better ID to use. Determining that the new Network Identifier is better than the current Network Identifier can include, for example, comparing a parameter value associated with each node; and changing the current Network Identifier of the node to the new Network Identifier using a predetermined criteria. The predetermined criteria can include, for example, the new parameter value is less than the current parameter value, the new parameter value is higher than the current parameter value, and/or the new parameter value is closer to a target parameter value than the current parameter value. The parameter value can be, for example, the Network Identifier, a timestamp, and a randomly chosen number. (For example, the node may update its internal memory to use the new Network Identifier when the received BSSID is lower than the current BSSID). Next, in Step 340, the node propagates the new Network Identifier to other nodes with whom the node has a security association. The operation of the node then cycles back to the idles state of Step 305.

FIG. 4 is a flowchart illustrating another merge algorithm in accordance with some embodiments of the present invention. Specifically, FIG. 4 illustrates the operation 400 of a node within a communication network in accordance with the present invention. As illustrated, the operation 400 begins with Step 405 in which the node is in an idle state. Next, in Step 410, the node determines whether it has received a Network Identifier update message from a node in which it has a current security association. When it has not received such a message, the operation cycles back to the idle state of Step 405. When it has received a Network Identifier update message from a node in which it has a current security association, the operation continues to Step 415 in which the node determines whether the Network Identifier is new. When the Network Identifier is not new, the operation cycles back to the idle state of Step 405. When the Network Identifier is new, the operation continues to Step 420 in which the node updates its internal memory to use the new Network Identifier. The operation then continues to Step 425 in which the node propagates the new Network Identifier to other nodes with whom the node has a security association. The operation then cycles back to the idle state of Step 405.

Figure 5:
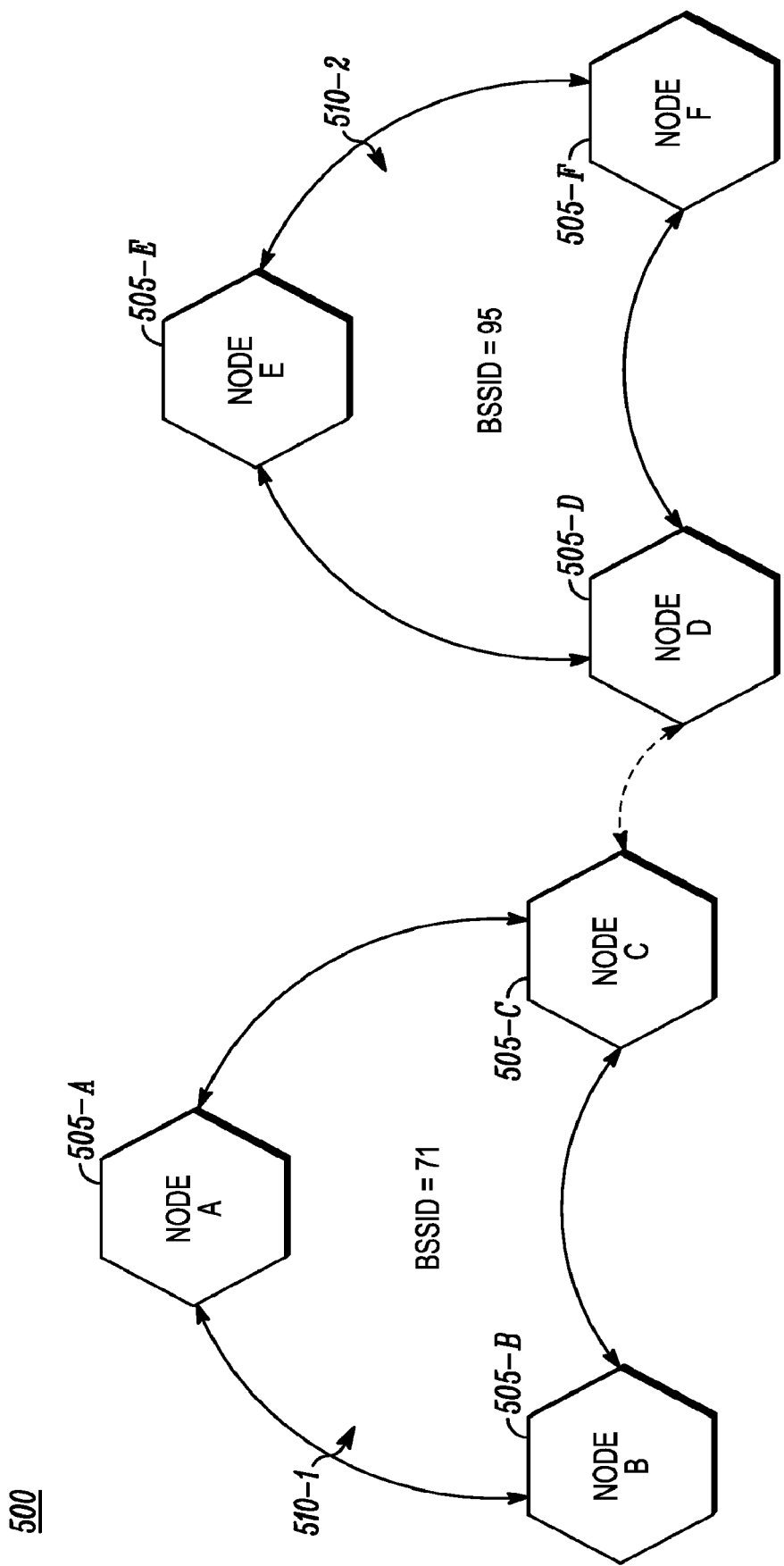
FIG. 5 illustrates an example basic system diagram for implementing the merge operation of some embodiments of the present invention.

FIG. 5 illustrates an example basic system diagram for implementing the merge operation of some embodiments of the present invention. Specifically, FIG. 5 illustrates a communication network 500 in which node A 505-A, node B 505-B, and node C 505-C have formed security associations with each other, thereby forming a first network partition 510-1; and in which node D 505-D, node E 505-E, and node F 505-F have formed security associations with each other, thereby forming a second network partition 510-2. The Network Identifier in the example of FIG. 5 is a BSSID. The BSSID for the first network partition 510-1, for example purposes, is 71. The BSSID for the second network partition 510-2, for example purposes, is 95.

In accordance with the operation of the present invention, when Node D 505-D and Node C 505-C authenticate with each other, node D 505-D will determine that nodes in its partition (the second network partition 510-2) will have to change their BSSID to be equal to the lower BSSID which was being used by the first network partition 510-1 that node C 505-C is participating in.

Figure 6:
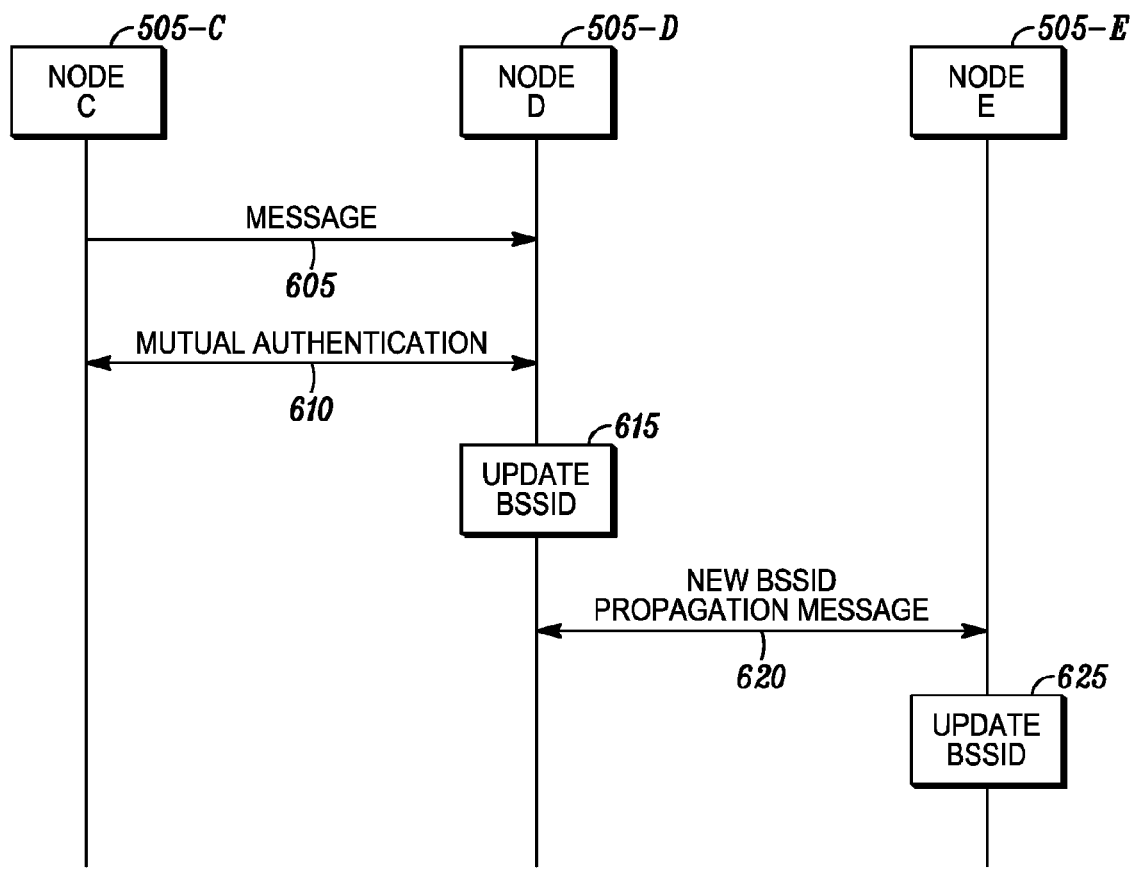
FIG. 6 is a message sequence diagram illustrating the operation of the network of FIG. 5 in accordance with some embodiments of the present invention.

FIG. 6 is a message sequence diagram 600 illustrating the operation of the network 500 in accordance with some embodiments of the present invention. Specifically, FIG. 6 illustrates the operation of node C 505-C, node D 505-D, and node E 505-E of the network 500. As illustrated, Node C 505-C transmits a message 605 which is received by node D 505-D. The message 605, for example, can be a beacon. Node C 505-C and Node D 505-D then perform a mutual authentication 610. Next, Node D 505-D updates its stored BSSID 615 to be that received from Node C 505-C. Node D 505-D then transmits a new BSSID propagation message 620 which is received by Node E 505-E. Node E 505-E then updates it's stored BSSID 625 to be equal to that received from Node C 505-C.

Figure 7:
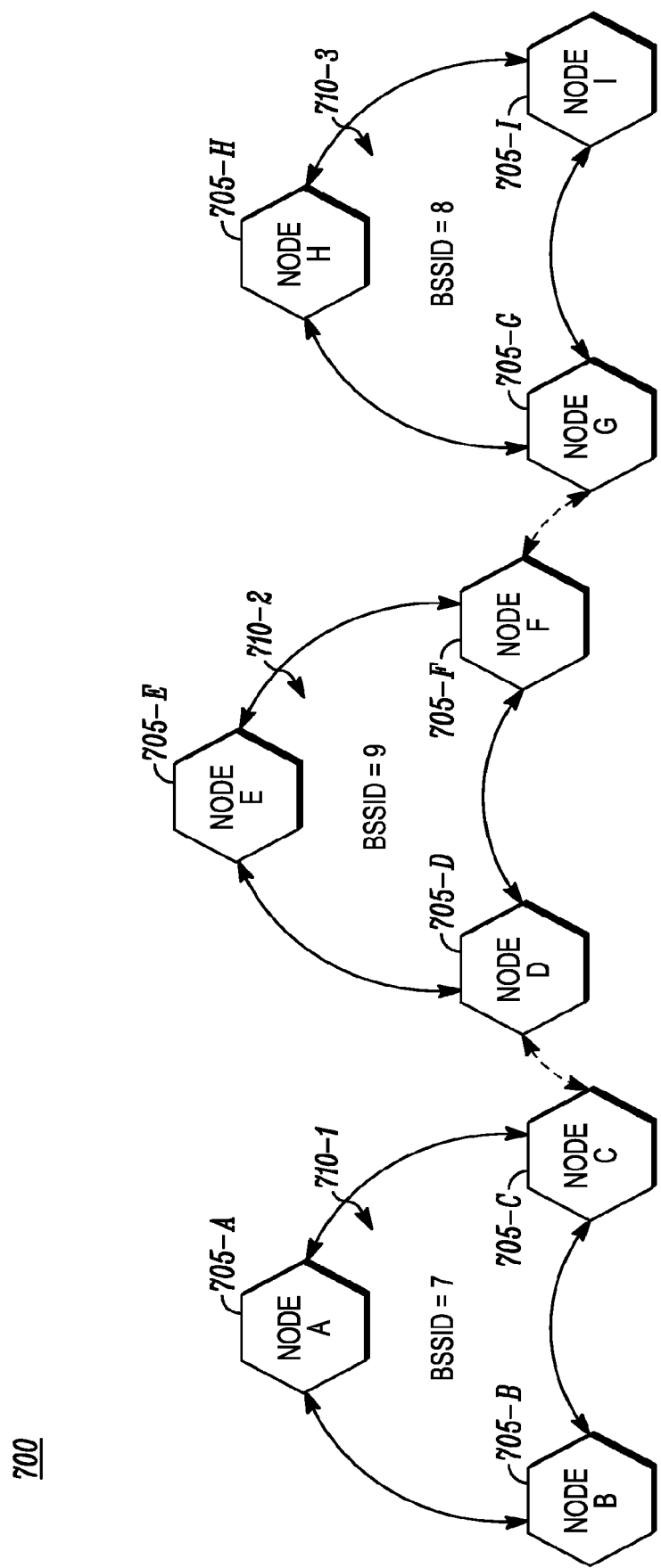
FIG. 7 illustrates a network comprising three network partitions.

It will be appreciated, that more than two network partitions can exist within a network. For example, FIG. 7 illustrates a network 700 comprising three network partitions in which the center group can move between the two other groups, thus creating connectivity between all three groups. As illustrated in FIG. 7, node A 705-A, node B 705-B, and node C 705-C have formed security associations with each other, thereby forming a first network partition 710-1. Similarly, node D 705-D, node E 705-E, and node F 705-F have formed security associations with each other, thereby forming a second network partition 710-2. Similarly, node G 705-G, node H 705-H, and node 1705-1 have formed security associations with each other, thereby forming a third network partition 710-3. For example purposes, the Network Identifier in the example of FIG. 7 is a BSSID. The first network partition 710-1 operates using a BSSID=7, the second network partition 710-2 operates using a BSSID=9, and the third network partition 710-3 operates using a BSSID=8.

Figure 8:
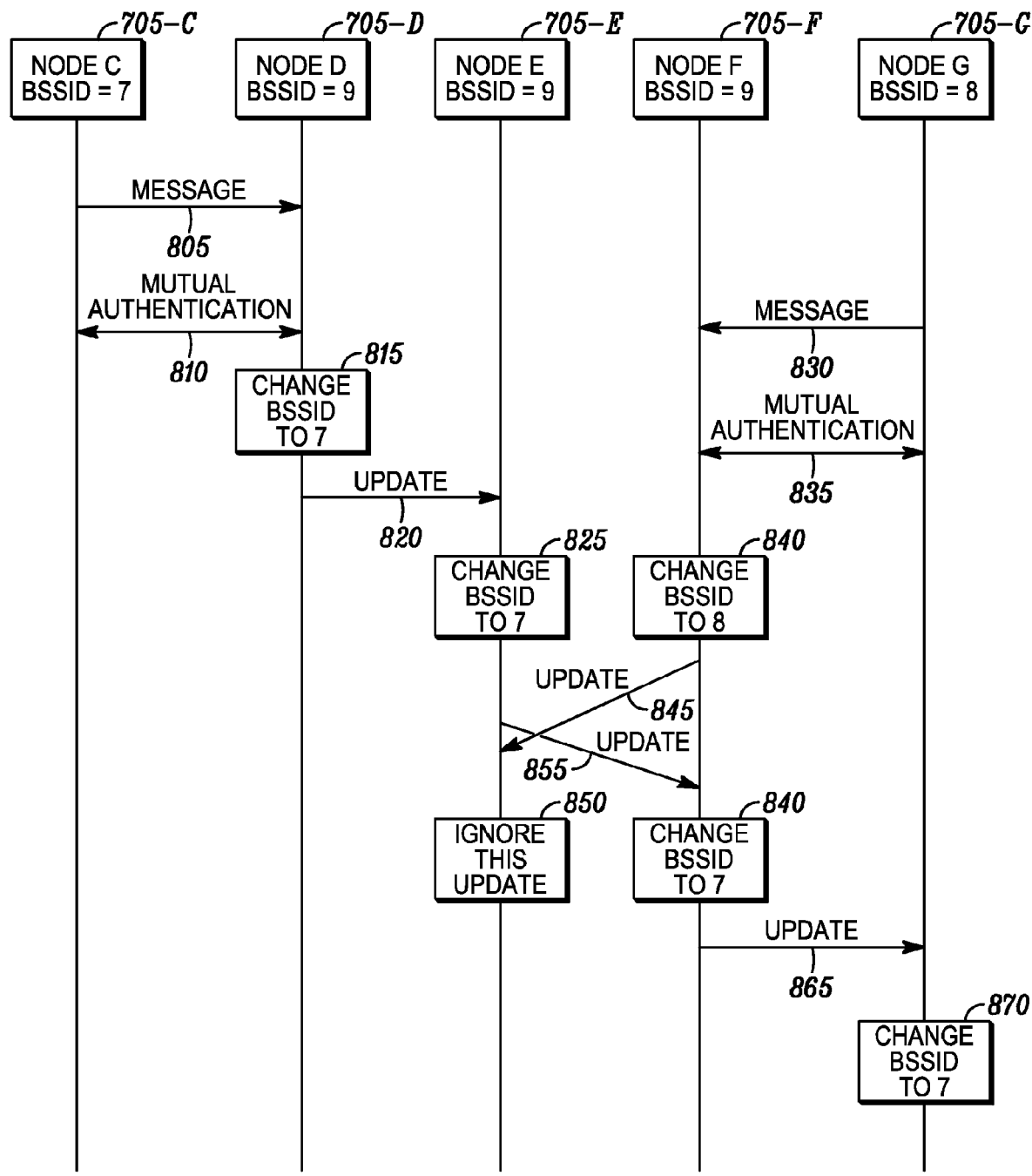
FIG. 8 is a message sequence diagram illustrating the operation of the network of FIG. 7 in accordance with some embodiments of the present invention.

FIG. 8 is a message sequence diagram 800 illustrating how the algorithms of the present invention resolve the correct BSSID for the entire new merged partition of FIG. 7. In the example of FIG. 8, the parameter value is the Network Identifier, and the criteria is that the new Network Identifier is less than the current Network Identifier. It will be appreciate by those of ordinary skill in the art that a similar messaging approach can be implemented for any parameter value and/or any criteria in accordance with the present invention. Specifically, in accordance with FIG. 8, although node F 705-F begins to propagate the new BSSID=8, when it arrives at a node with a lower BSSID, the lower SSID will be selected, and continue to propagate through out the remainder of the network 700.

As illustrated in FIG. 8, Node C 705-C transmits a message 805 including its BSSID=7 which is received by node D 705-D. The message 805, for example, can be a beacon. Node C 705-C and Node D 705-D then perform a mutual authentication 810. Node D 705-D, determining that the received BSSID=7 is less than its current BSSID=9, then changes 815 its BSSID to 7. Node D 705-D then transmits a BSSID update 820 which is received by Node E 705-E. Node E 705-E then changes 825 its BSSID to 7.

In parallel, Node G 705-G transmits a message 830 including its BSSID=8 which is received by node F 705-F. The message 830, for example, can be a beacon. Node F 705-F and Node G 705-G then perform a mutual authentication 835. Node F 705-F, determining that the received BSSID=8 is less than its current BSSID=9, then changes 840 its current BSSID to 8. Node F 705-F then transmits an update 845 which is received by Node E 705-E. Since Node E's 705-E current BSSID=7, Node E 705-E ignores 850 the update received from Node F 705-F.

In parallel, based on the changes 825 of its BSSID previously, Node E 705-E transmits a BSSID update 855 to Node F 705-F. Upon receipt of the update, Node F 705-F determines that the new BSSID=7 is less than its current BSSID=8 so it changes 860 its BSSID to 7. Node F 705-F then transmits a BSSID update 865 which is received by Node G 705-G. Node G 705-G determines that the new BSSID=7 is less than its current BSSID=8, so it changes 870 its BSSID to 7.

The present invention provides a method applicable to wireless ad-hoc networks for identifying nodes and network partitions that can share the same security features. The method is based on two criteria identifying the fact that two neighboring nodes do not share the same security features and should share the same security features. The present invention provides a method of detecting partitioned networks and establishing security associations to bridge the networks, then propagating a new Network Identifier.

The present invention, as described herein, provides a method of merging two partitions of an ad hoc network by synchronizing the Network Identifier value, which will differ between the two partitions. The need for a merge is signaled by a same SSID value between the two partitions. The method includes a merge algorithm to determine a merge should be initiated and a message (mechanism) to synchronize the Network Identifier. The Network Identifier update depends on a security association with a neighbor.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of operation of a node within an ad hoc network, the method comprising:
    monitoring one or more messages from one or more other nodes in the ad hoc network to identify a Network Name and a Network Identifier associated with each of the other nodes;
    comparing each Network Name with a current Network Name of the node;
    for each of the other nodes having the same Network Name as the current Network Name of the node, comparing each Network Identifier with a current Network Identifier of the node; and
    when at least one Network Identifier of at least one other node is different from the current Network Identifier of the node, using an arbitration method to determine if the node should change the current Network Identifier to a second Network Identifier,
    wherein the arbitration method comprises:
    comparing a parameter value associated with each of the at least one other node and the node; and
    changing the current Network Identifier of the node to the second Network Identifier of one of the other nodes having the same Network Name using one of the criteria selected from a group comprising (a) when the parameter value of the at least one other node is lower than parameter value of the node, (b) when the parameter value of the at least one other node is higher than the parameter value of the node, and (c) when the parameter value of the at least one other node is closer to a target parameter value than the parameter value of the node.

2. The method as claimed in claim 1, wherein the Network Name comprises a Service Set Identifier.

3. The method as claimed in claim 1, wherein the Network Identifier comprises a Basic Service Set Identifier.

4. The method as claimed in claim 1, wherein the parameter value is selected from a group comprising the Network Identifier, a timestamp, and a randomly chosen number.

5. The method as claimed in claim 1, further comprising:
    transmitting an indication that it has changed its Network Identifier to the second Network Identifier to one or more neighbor nodes, wherein the one or more neighbor nodes operate using the original Network Identifier.

6. The method as claimed in claim 1, further comprising:
    forming security associations between the node and one or more neighbor nodes, wherein the one or more neighbor nodes operate using the second Network Identifier.

7. The method as claimed in claim 1, where the arbitration method comprises:
    transmitting a Network Identifier update message to one of the other nodes having the same Network Name, when the second Network Identifier is higher than the current Network Identifier, wherein the Network Identifier update message informs the other nodes to change to the current Network Identifier of the node.

8. A method of operation of a node within an ad hoc network, the method comprising:
    operating the node within a portion of the ad hoc network using a Network Name and a current Network Identifier, wherein a first parameter value is associated with the node;
    receiving a Network Identifier update message including a second Network Identifier and a second parameter value from another node operating within the portion of the ad hoc network using the Network Name;
    comparing the second parameter value to the first parameter value; and
    operating the node using the second Network Identifier when the second parameter value meets a pre-determined criteria, wherein the pre-determined criteria is selected from a group comprising (a) the second parameter value is lower than the first parameter value, (b) the second parameter value is higher than the first parameter value, and (c) the second parameter value is closer to a target parameter value than the first parameter value.

9. The method as claimed in claim 8, wherein the parameter value is selected from a group comprising the Network Identifier, a timestamp, and a randomly chosen number.

10. The method as claimed in claim 8, wherein the Network Name comprises a Service Set Identifier.

11. The method as claimed in claim 8, wherein the current Network Identifier comprises a first Basic Service Set Identifier, and wherein the second Network Identifier comprises a second Basic Service Set Identifier.

12. The method as claimed in claim 8, further comprising:
    transmitting an indication that it has changed its Network Identifier to the second Network Identifier to one or more neighbor nodes, wherein the one or more neighbor nodes operate using the current Network Identifier.

13. The method as claimed in claim 8, further comprising:
    forming security associations between the node and one or more neighbor nodes, wherein the one or more neighbor nodes operate using the second Network Identifier.

14. A method for merging of ad hoc network partitions within an ad hoc network, the method comprising:
    forming a first network partition by forming a first security association among a first group of nodes including a first Network Identifier;
    forming a second network partition by forming a second security association among a second group of nodes including a second Network Identifier;
    communicating a message including the first Network Identifier from a first node of the first group of nodes to a second node of the second group of nodes;
    performing a mutual authentication between the first node and the second node;
    comparing the first Network Identifier to the second Network Identifier by the second node; and operating the second node using the first Network Identifier when the first Network Identifier meets a predetermined criteria as compared to the second Network Identifier, wherein each node has an associated parameter value, and further wherein the predetermined criteria is selected from a group comprising: (a) a parameter value of the second node is lower than the parameter value of the first node, (b) the parameter value of the second node is higher than the parameter value of the first node, and (c) the parameter value of the second node is closer to a target parameter value than the parameter value of the first node.

15. The method as claimed in claim 14, wherein the message comprises a beacon.

16. The method as claimed in claim 14, wherein the parameter value is selected from a group comprising the Network Identifier, a timestamp, and a randomly chosen number.

17. The method as claimed in claim 14, further comprising:
communicating a Network Identifier update message including the second Network Identifier from the second node to the second group of nodes; and
operating each of the second group of nodes using the second Network Identifier.

18. The method as claimed in claim 17, further comprising:
forming a third network partition by forming a third security association among a third group of nodes including a third Network Identifier;
communicating a message including the third Network Identifier from a third node of the third group of nodes to a fourth node of the second group of nodes;
performing a mutual authentication between the third node and the fourth node;
comparing the third Network Identifier to the first Network Identifier by the fourth node; and
operating the fourth node using the third Network Identifier when the third Network Identifier meets the predetermined criteria as compared to the first Network Identifier.

19. The method as claimed in claim 18, wherein the message comprises a beacon.

20. The method as claimed in claim 18, wherein each node has an associated parameter value, and further wherein the predetermined criteria is selected from a group comprising: (a) a parameter value of the third node is lower than the parameter value of the fourth node, (b) the parameter value of the third node is higher than the parameter value of the fourth node, and (c) the parameter value of the third node is closer to a target parameter value than the parameter value of the fourth node.

21. The method as claimed in claim 20, wherein the parameter value is selected from a group comprising the Network Identifier, a timestamp, and a randomly chosen number.

22. The method as claimed in claim 20, further comprising:
continuing to operate the fourth node using the first Network Identifier when the third Network Identifier does not meet the predetermined criteria as compared to the first Network Identifier.

\* \* \* \* \*

UNITED STATES PATENT AND TRADEMARK OFFICE
CERTIFICATE OF CORRECTION

PATENT NO.       : 7,792,050 B2
APPLICATION NO.  : 11/924859
DATED            : September 7, 2010
INVENTOR(S)      : Metke et al.

It is certified that error appears in the above-identified patent and that said Letters Patent is hereby corrected as shown below:

IN THE SPECIFICATION

In Column 8, Line 9, delete "1705-1" and insert -- I 705-I --, therefor.

IN THE CLAIMS

In Column 10, Line 5, in Claim 7, delete "where" and insert -- wherein --, therefor.

Signed and Sealed this
Nineteenth Day of June, 2012

David J. Kappos
*Director of the United States Patent and Trademark Office*